United States Patent Office
2,901,480
Patented Aug. 25, 1959

2,901,480
PROCESS FOR THE MANUFACTURE OF NEW PYRROLE DERIVATIVES

Adolf Emil Siegrist, Basel, and Max Duennenberger, Birsfelden, Switzerland, assignors to Ciba Limited, Basel, Switzerland No Drawing. Application July 24, 1957
Serial No. 673,761

Claims priority, application Switzerland July 31, 1956

14 Claims. (Cl. 260—249.6)

This invention provides new pyrrole derivatives which, in the form of their free bases, correspond to the formula (1a)  $\quad\quad\quad X_1-Z-X_2$ in which $X_1$ and $X_2$ each represents a benzimidazole radical bound to Z in its 2-position and Z represents a pyrrole radical bound to $X_1$ and $X_2$ in its 2:5-position. Particularly, the invention provides pyrrole derivatives which, in their free base state, correspond to the formula (1b) 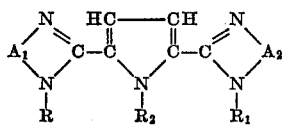

in which each of the radicals $A_1$ and $A_2$ represent a benzene nucleus which may contain substituents and of which two vicinal carbon atoms are bound to the two imidazole nitrogen atoms, and in which R and $R_1$ represent hydrogen atoms or the same or different substituents, and $R_2$ represents hydrogen or an acyl group or a substituted or unsubstituted alkyl, cycloalkyl, aryl or aralkyl group. The invention provides the free bases of the formulae 1 and salts thereof, including quaternary ammonium salts of these pyrrole derivatives.

The two benzene nuclei $A_1$ and $A_2$ in the above Formula 1b may be substituted by halogen atoms, such as chlorine, sulfonic acid groups or alkyl or alkoxy groups. R and $R_1$ may be, for example, hydrogen atoms. Furthermore they may represent any radicals, for example, of aromatic or heterocyclic character. They are more especially aliphatic or araliphatic radicals and advantageously lower alkyl, alkenyl or hydroxyalkyl groups, such as methyl, ethyl, isopropyl, allyl or hydroxyethyl groups. The salts of these new pyrrole derivatives may be those of inorganic or organic acids, for example, sulfuric acid, hydrochloric acid or phosphoric acid, or aryl sulfonic acids, for example, paratoluene sulfonic acid.

The new pyrrole derivatives, of which the free bases have the above Formula 1b, can be obtained by reacting a di-imidazole derivative of the formula (2) 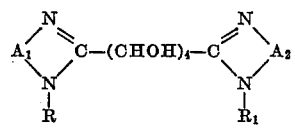

in which $A_1$ and $A_2$ represent benzene nuclei which may contain substituents and of which two vicinal carbon atoms are bound to the two imidazole nitrogen atoms, and R and $R_1$ represent hydrogen atoms or the same or different substituents advantageously in the form of a salt thereof, with ammonia or an agent yielding ammonia or a primary amine, and, if desired acylating, alkylating, alkenylating, hydroxyalkylating, aralkylating and/or sulfonating the pyrrole compound so obtained, and if desired, converting the compound so obtained into a quaternary ammonium salt thereof.

The diimidazole derivative of the Formula 2 can be obtained by reacting an aromatic ortho-diaminobenzene, of which one amino group is primary and the other is at most secondary, or a salt thereof, advantageously in a dilute aqueous mineral acid, with a tetroxy-dicarboxylic acid of the formula

or with a functional derivative of such acid, and if desired, reacting the diimidazole so obtained with an alkylating, hydroxyalkylating or aralkylating agent. Suitable ortho-diaminobenzenes are, for example, orthophenylene diamine, isopropyl ortho-phenylene diamine, 1-methoxy-3:4-diaminobenzene, 1-amino-2-monomethylaminobenzene, 1-methyl-3:4-diaminobenzene or 1-chloro-3:4-diaminobenzene. There is advantageously used orthophenylene diamine. As tetroxy-dicarboxylic acids of the above formula there may be mentioned manno-saccharic acid, idosaccharic acid, talomucic acid and allomucic acid, that is to say, dicarboxylic acids derived from aldohexoses. Advantageously, saccharic acid or mucic acid is used on account of its reactivity and the ease with which it can be obtained. As functional derivatives of these tetroxy-dicarboxylic acids, which may be used for the condensation instead of the free acids, there may be mentioned principally their lactones and also their esters with aliphatic alcohols of low molecular weight and finally their amides.

The reaction between the components is advantageously carried out by heating them in a dilute aqueous mineral acid at a moderately raised temperature advantageously in an inert gas, for example, a current of nitrogen. As solvents there may be used, for example, sulfuric acid of 5–50% strength, hydrochloric acid of 5–20% strength or ortho-phosphoric acid of 15–50% strength. Temperatures within the range of 80–120° C. are advantageous for the condensation. The alkylation, alkenylation or aralkylation of the diimidazoles of the Formula 2, which may be carried out if desired, can be carried out in the usual manner, for example, by treatment with an alkyl halide, alkenyl halide, hydroxyalkyl halide or aralkyl halide, such as ethylene chlorhydrin, allyl bromide or benzyl chloride, and advantageously with the addition of an acid-binding agent. For the alkylation there may also be used dialkyl sulfates, such as dimethyl sulfate.

The diimidazole derivatives of the Formula 2, the preparation of which is described above, are then reacted in the process of this invention with ammonia, an agent yielding ammonia or a primary amine. There are advantageously used salts of the diimidazole derivatives, for example their sulfates.

As agents yielding ammonia there may be mentioned, for example, ammonium sulfate, ammonium acetate, thiourea and especially urea.

The primary amines, which may be used instead of ammonia or agents yielding ammonia, may be of the hydroaromatic, araliphatic or advantageously the aliphatic, heterocyclic or aromatic series.

As primary aliphatic amines there may be used either straight chain or branched chain, saturated or unsaturated amines. There may be mentioned, for example, methylamine, ethylamine, propylamine, isopropylamine, butylamine, isobutylamine and allylamine, and also primary aliphatic monoamines containing for example up to 18 carbon atoms, such as octadecylamines.

Among the primary hydroaromatic amines there may be mentioned, for example, cyclohexylamine.

The primary araliphatic amines are advantageously derivatives of benzylamine, and there may be mentioned benzylamine itself and nuclear substitution derivatives thereof, for example, those substituted by halogen or alkyl or alkoxy groups.

The aromatic amines may be mononuclear or polynuclear and may contain further substituents. There are advantageously used aniline and nuclear substitution products thereof, for example, ortho- or para-toluidine, various chloranilines, ortho- or para-anisidine, aminobenzene carboxylic acids or sulfonic acids, such as 1-aminobenzene-3- or -4-carboxylic acid or -3- or -4-sulfonic acid. There may also be used naphthylamines, such as $\alpha$- or $\beta$-naphthylamine or nuclear substitution products thereof.

Finally, there may also be used primary heterocyclic amines, for example, 2-aminothiazole or melamine.

The reaction of the diimidazole derivatives of the Formula 2, which are advantageously used in the form of their salts, for example, their sulfate, with ammonia, an agent yielding ammonia or a primary amine is advantageously carried out at a raised temperature, preferably at a temperature above 80° C., for example, 100–180° C., and advantageously in the presence of a solvent such as glycol, glycerine, xylenes, chlorobenzene or tetrahydronaphthalene. An especially suitable solvent is glacial acetic acid. In certain cases as, for example, when aniline is used, the reaction may be carried out without the aid of a solvent by merely heating together the reaction components at a temperature indicated above. The condensation products are generally obtained as salts, which may then be converted into the free bases in the usual manner, for example, by treatment with an aqueous solution of sodium carbonate or ammonium hydroxide.

The pyrrole derivatives are obtained by the reaction of the diimidazole derivatives of the Formula 2 with ammonia or an agent yielding ammonia in accordance with the following scheme:

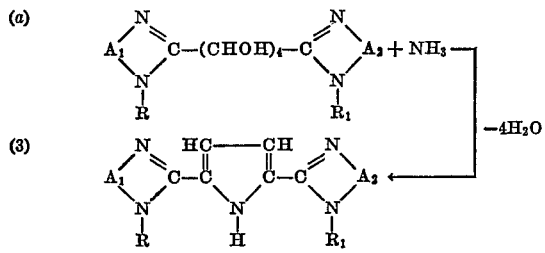

(in which $A_1$, $A_2$, R and $R_1$ have the meanings given above), and may, if desired, be acylated. The acylation may be carried out by methods in themselves known, for example, by treating a pyrrole derivative of the Formula 3 with a carboxylic acid chloride, such as acetyl chloride or benzoyl chloride, in an anhydrous inert organic solvent.

The alkylation, hydroxyalkylation or aralkylation of the pyrrole derivatives, for example, of the formula

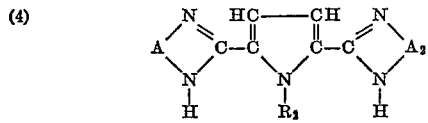

(in which $A_1$, $A_2$ and $R_2$ have the meanings given above) which may be carried out if desired, can also be carried out in the usual manner, for example, by treatment with an alkyl halide such as ethyl chloride, an alkylene halogen hydrin, for example, ethylene chlorhydrin or propylene chlorhydrin, or an aralkyl halide such as benzyl chloride, advantageously with the addition of an acid-binding agent. Dialkyl sulfate, such as dimethylsulfate, may also be used for the alkylation.

For the purpose of sulfonation, which may be carried out, if desired, the pyrrole derivatives of the Formula 1 are treated in the usual manner, for example, with sulfuric monohydrate, chlorosulfonic acid or sulfuric acid containing sulfur trioxide, and if desired, at a raised temperature.

Quaternary ammonium salts of the pyrrole derivatives of the Formula 1, which salts may be prepared in accordance with the invention, if desired, can be made by reacting a pyrrole derivative of the Formula 1 or a salt thereof with a compound capable of quaternating an imidazole nitrogen atom. As such compounds there come into consideration principally the usual alkylating or aralkylating agents. There may be mentioned, for example, methyl iodide, ethyl bromide, isopropyl chloride, secondary-butyl bromide, dodecyl bromide, epichlorhydrin, dimethyl sulfate, benzyl halides and benzyl halides substituted in the nucleus, for example, by halogen or alkyl or alkoxy groups, such as benzyl chloride, para-chlorobenzyl chloride, and also menaphthyl chloride, toluene sulfonic acid esters, aryl sulfonic acid alkyl esters, especially those of the benzene series containing alkyl groups of low molecular weight, such as toluene sulfonic acid methyl or ethyl ester, and also compounds which contain a group imparting solubility in water, such as halogen alkyl sulfonic acids or aralkyl sulfonic acids, for example, bromethane sulfonic acid or benzyl chloride disulfonic acid. If salts of imidazoles are used as starting materials, there may be used for quaternation alkylene oxides, such as ethylene oxide, propylene oxide or glycide, or finally aliphatic alcohols of low molecular weight, such as methanol or ethanol. The quaternation is carried out under the conditions usual for these reactions advantageously by heating the components at a raised temperature, for example, of 50–200° C., and, if desired, under pressure. It may be of advantage to use an inert solvent such as an alcohol, for example, methanol, ethanol, dioxane, glycol, monomethyl glycol, benzene, toluene or nitrobenzene or a mixture of two or more of these solvents. It may be of advantage to use an excess of the quaternating agent.

The new pyrrole derivatives of this invention exhibit in a dissolved or finely dispersed state a more or less pronounced fluorescence. Depending on their constitution they can be used for rendering organic materials opaque to ultra-violet rays, for optically brightening organic materials especially fibrous materials, or as intermediate products for the manufacture of dyestuffs.

Those compounds exhibiting fluorescence, with can be used for optical brightening, may be applied by impregnating the material to be treated with a solution, if the product is soluble, especially an aqueous solution or a dispersion of the compound and drying the material after centrifuging or squeezing it. Instead of aqueous solutions, there may be used especially for products which are sparingly soluble to insoluble in water solutions of the compounds in organic solvents. The materials may also be treated with the compounds in dispersed form, for example, with dispersions obtained with the aid of dispersing agents, such as soaps, soap-like substances, polyglycol ethers of fatty alcohols, sulfate cellulose waste liquor or condensation products of formaldehyde with naphthalene sulfonic acids, which may be alkylated.

The compounds suitable as optical brightening agents may also be applied to the materials to be treated in the course of the manufacture of the materials, for example, by incorporating such a compound with a paper pulp or a viscous solution, to be used for the production of films or filaments, or to other spinning compositions, for example, those of linear synthetic polyamides, or an acetyl-cellulose solution to be used for spinning.

The compounds serving as optical brightening agents can be made as follows:

(a) In admixture with dyestuffs or as additions to dyebaths, printing pastes or discharge or reserve pastes, and also for after-treating dyeings, prints or discharge prints.

(b) In admixture with chemical bleaching agents or as additions to bleaching baths.

(c) In admixture with dressing agents, such as starches or synthetic dressings. For example, the compounds of the invention may be incorporated with liquors used for imparting an anti-crease dressing.

(d) In conjunction with detergents. The detergent and brightening agent may be added separately to the washing bath. It is also advantageous to use a detergent containing the brightening agent admixed therewith. As detergents there are suitable, for example, soaps, salts of sulfonated detergents, for example, sulfonated benzimidazoles substituted at the 2-carbon atom by a higher alkyl radical, salts of monocarboxylic acid esters of 4-sulfophthalic acid with higher fatty alcohols, salts of fatty alcohol sulfonates, alkyl-aryl-sulfonic acids or condensation products of higher fatty acids with aliphatic hydroxy- or amino-sulfonic acids. There may also be used non-ionic detergents, for example, polyglycol ethers derived from ethylene oxide and a higher fatty alcohol, alkyl-phenol or fatty amine.

The following examples illustrate the invention, the parts and percentages being by weight unless otherwise stated and the relationship of parts by weight to parts by volume being the same as that of the kilogram to the liter:

*Example 1*

A mixture of 470 parts of the condensation product of the formula (5)
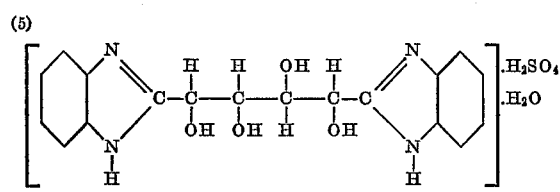

and 120 parts of urea in 1350 parts by volume of glacial acetic acid is heated for 18 hours at the boil under reflux, while stirring. Yellow needles gradually separate from the initially brown reaction solution. The whole is slowly cooled to 10–15° C. and then stirred for 1–2 hours at that temperature. The precipitated crystalline reaction product is filtered off, washed first with glacial acetic acid and then with water, and dried. There are obtained about 364 parts of a yellow crystalline powder. In order to prepare the free base the reaction product is introduced before or after being dried into hot water, and an aqueous ammonium hydroxide solution is added, while stirring, until the reaction remains alkaline. By filtering the mixture, washing the filter residue with water and drying it there are obtained about 277 parts, corresponding to 92.6% of the theoretical yield of 2:5-di-[benzimidazyl-(2)]-pyrrole of the formula (6)
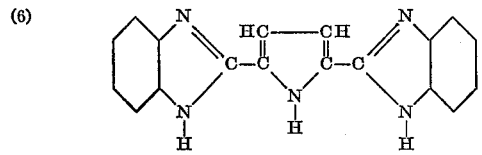

in the form of a bright beige-yellow powder, which is soluble in the cold in an aqueous solution of sodium hydroxide to give an intense violet-blue fluorescence. It can be obtained in pure form as small pale yellow needles by recrystallization from aqueous methyl alcohol. The new pyrrole derivative can be heated to 340° C. without melting.

*Analysis.*—$C_{18}H_{13}N_5$.—Calculated: C, 72.22; H, 4.38; N, 23.40. Found: C, 72.08; H, 4.68; N, 23.42.

The di-para-toluene sulfonate of this compound forms pale yellow lamellate, which melt at 312.5 to 313.5° after recrystallisation from ethanol.

*Analysis.*—$C_{32}H_{29}O_6N_5S_2$.—Calculated: C, 59.70; H, 4.54; N, 10.88; S, 9.96. Found: C, 59.72; H, 4.66; N, 10.97; S, 10.07.

The resulting 2:5-di-[benzimidazyl-(2)]-pyrrole is suitable as an optical brightening agent for polyacrylonitrile fibers. The condensation product used as starting material in this example may be prepared as follows:

248 parts of the acid potassium salt of saccharic acid are introduced into 1750 parts by volume of sulfuric acid of 10% strength, while stirring, and with the exclusion of air. 216 parts of ortho-phenylene diamine are then distilled in, and the temperature is then raised to the gentle boil in 3 hours. The resulting solution is further stirred for 18–24 hours at 105–110° C. with the exclusion of air. The reaction mixture is then cooled to 10–15° C., and further stirred for a few hours at that temperature. The crystalline mass which separates out is filtered off, and the filter residue is washed neutral to Congo with ice water and dried. There are obtained about 438 parts of a greyish white crystalline powder, which corresponds to a yield of 93.4%. By recrystallization from sulfuric acid of 10% strength with the addition of active charcoal the condensation product of the Formula 5 is precipitated as colorless crystalline powder, which dissolves in hot water fairly easily. It melts at 208–210° C. with decomposition.

By using in this example, instead of the condensation product described above, an equimolecular quantity of the condensation product of the formula (7)
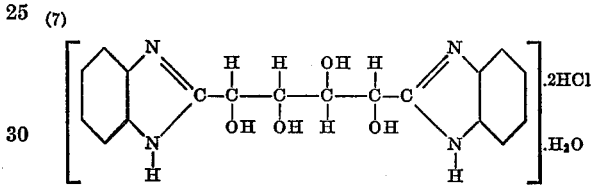

there is likewise obtained 2:5-di-[benzimidazyl-(2)]-pyrrole.

*Example 2*

A mixture of 156 parts of the condensation product of the formula (8)
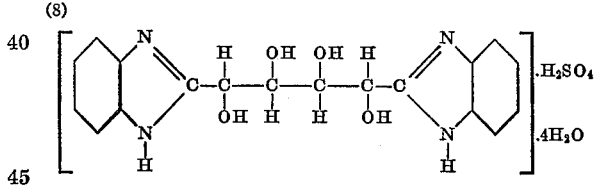

and 60 parts of urea in 650 parts by volume of acetic acid is heated for 20 hours at a gentle boil under reflux, while stirring. Yellow needles gradually separate out of the initially colorless reaction mixture. The mixture is slowly cooled to 15–20° C., then stirred for 1–2 hours at that temperature, and the precipitated reaction product is filtered off. After washing the filter residue with glacial acetic acid and water and then drying it, there are obtained about 100 parts of a yellowish crystalline powder. In order to prepare the free base the product so obtained is introduced into hot water, and sodium carbonate is added, while stirring, until the reaction remains alkaline. By filtering, washing the filter residue with water and drying it, there are obtained about 84 parts, corresponding to 84.3% of the theoretical yield, of 2:5-di-[benzimidazyl-(2)]-pyrrole of the Formula 6 in the form of a bright yellow powder. By recrystallization from aqueous methyl alcohol the new pyrrole derivative can be obtained in a pure form as small pale yellow needles. It has the same infra-red spectrum as the product of Example 1.

*Analysis.*—$C_{18}H_{13}N_5$—Calculated: C, 72.22; H, 4.38; N, 23.40. Found: C, 72.31; H, 4.56; N, 23.32.

By using in this example, instead of 60 parts of urea, 118.8 parts of ammonium sulfate and 36.0 parts of sodium hydroxide, there is likewise obtained 2:5-di-[benzimidazyl-(2)]-pyrrole.

The condensation product used as starting material in this example may be prepared as follows:

210 parts of mucic acid and 216 parts of freshly distilled ortho-phenylene diamine in 1500 parts by volume of sulfuric acid of 15% strength are stirred on a boiling water bath for 4 hours with the exclusion of air. The reaction mixture is then maintained at a gentle boil in an oil bath at 110–115° C. for 18–24 hours while stirring. There are then added 750 parts of hot water and the whole is slowly cooled to about 15° C. and stirred for 2–3 hours at that temperature. The precipitated crystalline mass is filtered off, and the filter residue is washed neutral to Congo with cold water and dried. There are obtained about 474 parts of a greyish white crystalline powder, which corresponds to a yield of 90.4% of the theoretical yield. By recrystallization from sulfuric acid of 10% strength with the addition of active charcoal the condensation product of the Formula 8 is obtained in the form of a colorless crystalline powder which becomes dark in color at 212° C. and decomposes above 249° C.

*Example 3*

A mixture of 470 parts of a condensation product of the Formula 5, 120 parts of urea and 132 parts of ammonium sulfate in 1600 parts by volume of anhydrous xylene is stirred with the exclusion of air. The reaction mixture is heated in the course of about one hour until water begins to separate, and is then stirred for 8–12 hours at 135–138° C. while distilling off and removing the water formed during the reaction. After cooling the mixture it is filtered, and the filter residue is washed with benzene and dried. The yellow reaction product is then introduced into hot water, and an aqueous ammonium hydroxide solution is added, while stirring, until the reaction remains alkaline. By filtering, washing the filter residue with water and drying it, 2:5-di-[benzimidazyl-(2)]-pyrrole is obtained in very good yield in the form of a bright slightly brownish yellow powder. It has the same properties as the product described in Example 1.

By using in this example 60 parts of urea, instead of 132 parts of ammonium sulfate, the same product is obtained.

*Example 4*

71 parts of the condensation product of the formula (9) 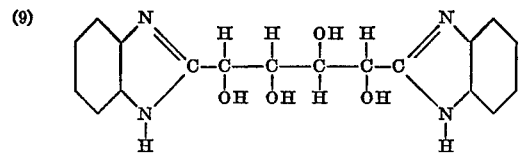

and 30 parts of urea are stirred with the exclusion of air in 250 parts by volume of ethylene glycol for 10–15 hours at 150–160° C. The clear brown reaction solution is cooled to about 10° C. and is run into 2000 parts of water, while stirring. After being allowed to stand for a short time the precipitated reaction product is filtered off, washed with water and dried. There is obtained 2:5-di-[benzimidazyl-(2)]-pyrrole in the form of a slightly brownish powder, which may be further purified from aqueous methyl alcohol with the addition of active charcoal. The product has properties similar to those of the product of Example 1.

*Example 5*

A mixture of 27.6 parts of the monosulfate of the compound of the formula

(10) 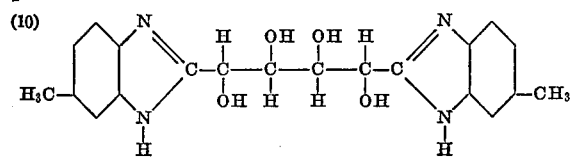

and 12 parts of urea in 200 parts by volume of glacial acetic acid is heated at the boil under reflux for 18–24 hours while stirring. Yellow crystals gradually separate from the initially colorless reaction mixture. The whole is cooled to 15–20° C., stirred at that temperature for 1–2 hours and filtered. By washing the filter residue with glacial acetic acid and water, and then drying it there is obtained a yellow crystalline powder.

To prepare the free base the powder is stirred in hot water with sodium carbonate. After filtering the mixture, cautiously washing the filter residue with water and drying it there is obtained 2:5-di-[6-methyl-benzimidazyl-(2)]-pyrrole of the formula

(11) 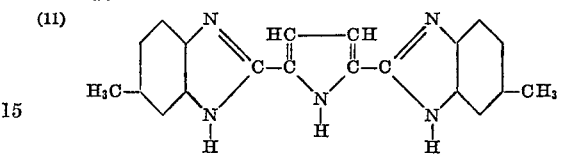

in the form of a bright yellow powder, which is soluble in the cold in aqueous sodium hydroxide solution to give a violet-blue fluorescence. The product is useful as an optical brightening agent for polyacrylonitrile fibers.

By using instead of the monosulfate of the compound of the Formula 10, 24.0 parts of the monosulfate of the compound of the formula

(12) 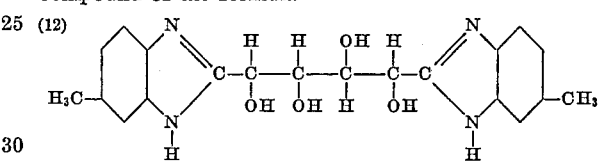

there is likewise obtained 2:5-di-[6-methyl-benzimidazyl-(2)]-pyrrole.

Pyrrole derivatives having similar properties are also obtained by using, instead of the monosulfate of the compound of Formula 10, an equimolecular quantity of the monosulfate of the compound of the formula

(13) 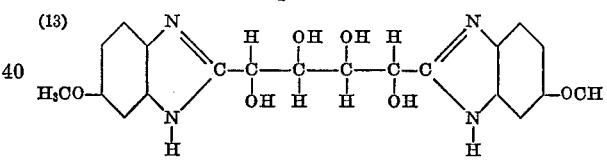

or

(14) 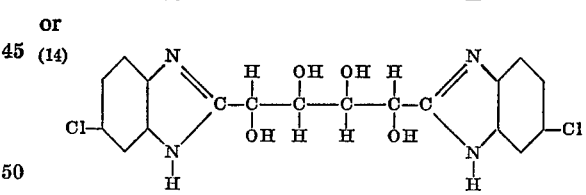

The monosulfates of the compounds of the Formulae 10, 12, 13 and 14 used as starting materials in this example can be obtained in a manner analogous to that described in the last paragraph of Example 2 by condensing one molecular proportion of mucic acid or saccharic acid with two molecular proportions of 1-methyl-3:4-diaminobenzene or 1 - methoxy - 3:4 - diaminobenzene or 1-chloro-3:4-diaminobenzene in moderately concentrated sulfuric acid.

*Example 6*

A mixture of 27.6 parts of the monosulfate of the compound of the formula

(15) 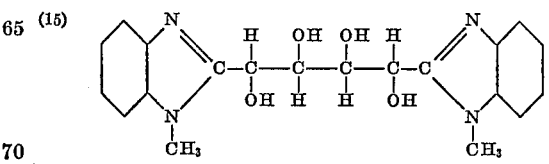

(prepared by the action of 2 mols of 1-amino-2-monomethylamino-benzene on 1 mol of mucic acid in moderately concentrated sulfuric acid) and 12.6 parts of urea in 200 parts by volume of glacial acetic acid is heated for 20–24 hours at the boil under reflux, while stirring.

After cooling the mixture to 15–20° C. the brown reaction product is rendered weakly alkaline with aqueous sodium hydroxide solution of 10% strength. The mixture is filtered, and the filter residue is washed with water and dried. In this manner there is obtained 2:5-di-[N-methyl-benzimidazyl-(2)]-pyrrole of the formula

(16)
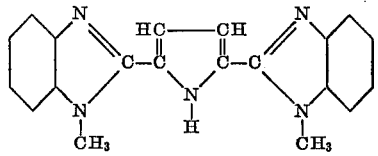

in the form of a yellow powder, which can be purified by way of its crystalline monosulfate. It can be used for the optical brightening of acetyl cellulose fibers.

A pyrrole derivative of similar properties is obtained when the compound of Formula 15 is replaced by the compound of formula (15a)
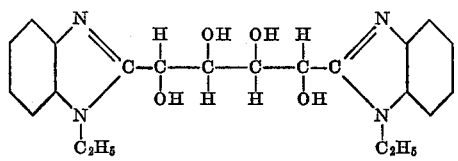

(prepared by the action of 2 mols of 1-amino-2-monoethylaminobenzene on 1 mol of mucic acid in moderately concentrated sulfuric acid).

*Example 7*

A mixture of 94 parts of the condensation product of the Formula 5 and 30.5 parts of monoethanolamine in 250 parts of ethylene glycol is heated with the exclusion of air for 3 hours at 130–135° C., whereby a clear yellow solution is obtained. The whole is stirred for a further 14 hours at 150–155° C., then cooled to room temperature and the reaction solution is introduced into about 2000 parts of water while stirring. The whole is cooled to about 10° C., and allowed to stand at that temperature for a short time and then filtered. By washing the filter residue with water and drying it there is obtained the condensation product of the formula

(17)
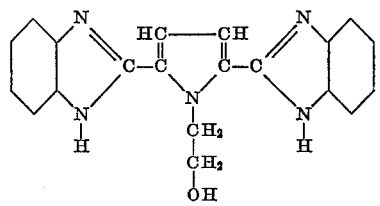

as a bright slightly brownish yellow powder, which can be further purified by recrystallization from hydrochloric acid of 5–10% strength. It is suitable for optically brightening cellulose fibers.

By using, instead of 30.5 parts of monoethanolamine, an equimolecular quantity of monoethylamine, a product having similar properties is obtained.

*Example 8*

A mixture of 94 parts of the condensation product of the Formula 5 and 27.7 parts of melamine in 250 parts by volume of ethylene glycol is stirred with the exclusion of air for 18 hours at 150–160° C., whereby a brownish yellow finely crystalline reaction product is obtained. The whole is cooled to room temperature and the reaction mixture is introduced into about 2000 parts of cold water while stirring. After filtering off the product and washing it with water, it may be further purified by dissolution in a dilute aqueous solution of sodium hydroxide at about 70–75° C., treating the mixture with active charcoal, and reprecipitating the product with acetic acid until the reaction is weakly alkaline to Brilliant Yellow. There are obtained about 48 parts of a pale yellow powder having the formula

(18)
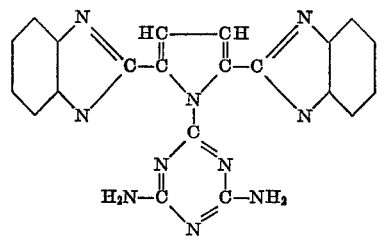

which is soluble in dilute aqueous acids and alkalies with the aid of heat to give a violet-blue fluorescence. It can be used for optically brightening polyamide fibers during the manufacture of the fibers.

*Example 9*

A mixture of 94 parts of the condensation product of the Formula 5 and 27.4 parts of para-aminobenzoic acid in 250 parts by volume of ethylene glycol is stirred with the exclusion of air for 15–20 hours at 150–160° C., whereby a clear solution is obtained. The whole is cooled to room temperature, 1500 parts of water are added, the mixture is rendered weakly alkaline to Brilliant Yellow with sodium carbonate, and the precipitated condensation product is filtered off. By washing it with water and drying it there is obtained the condensation product of the formula

(19)
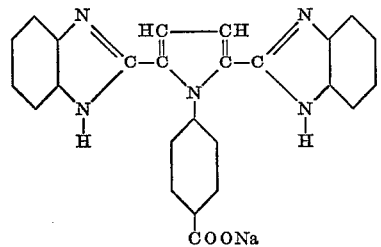

in the form of a slightly yellowish powder. The product may be further purified from aqueous alcohol with the addition of active charcoal, and is suitable as an optical brightening agent for cellulose fibers.

By using in this example, instead of 27.4 parts of para-aminobenzoic acid, 18.6 parts of aniline there is obtained 2:5-di-[benzimidazyl-(2)]-1-phenylpyrrole of the formula

(20)
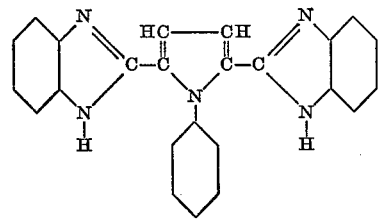

*Example 10*

A mixture of 94 parts of the condensation product of the Formula 5 and 40 parts of 1-aminobenzene-3-sulfonic acid in 250 parts of ethylene glycol is stirred with the exclusion of air for 15–20 hours at 155–165° C., whereby a clear brown solution is obtained. The whole is cooled to room temperature, 2000 parts of water are added, and the precipitated reaction product is filtered off and washed with water. The moist filter residue is dissolved in 2000 parts of water by the addition of sodium carbonate and with the aid of heat, and active charcoal is then added and the mixture is filtered. From the cooled filtrate the pyrrole derivative of the formula

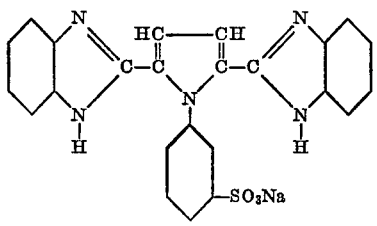

is precipitated with sodium chloride, filtered off, washed with aqueous sodium chloride solution and dried. It is a bright yellow powder which dissolved clearly in cold water. It is suitable as an optical brightening agent for cellulose fibers.

By using in this example instead of 1-aminobenzene-3-sulfonic acid an equivalent quantity of 1-aminobenzene-4-sulfonic acid, there is obtained a product having similar properties.

Example 11

40 parts of 2:5-di-[benzimidazyl-(2)]-pyrrole monosulfate are stirred in 150 parts of sulfuric acid and sulfonated at 70–75° C. by adding dropwise 120 parts of oleum containing 27% of free $SO_3$. The whole is stirred for a few hours at that temperature until a test portion of the reaction mixture dissolves to a clear solution in sodium carbonate solution of 10% strength. After being cooled the mixture is poured into ice water, while stirring, and the precipitated disulfonic acid is filtered off and washed with ice water. The filter residue is then suspended in water, neutralized with sodium hydroxide solution, and the solution so obtained is evaporated to dryness. The disodium salt of 2:5-di-[x-sulfobenzimidazyl-(2)]-pyrrole of the formula (22)

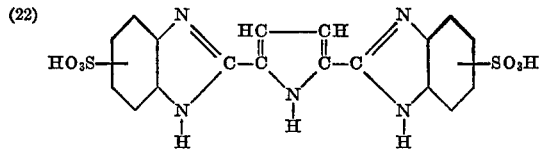

is a bright yellowish powder which is soluble in water. It can be used for optically brightening cellulose materials.

Example 12

29.9 parts of the 2:5 di-[benzimidazyl-(2)]-pyrrole obtainable as described in Example 1 or 2 are stirred in 300 parts by volume of anhydrous benzene with 7.9 parts of acetyl chloride for 3 hours at 50–60° C. After being cooled to room temperature, the reaction mixture is filtered, and the filter residue is washed with benzene and dried. The resulting hydrochloride of the reaction product of the probable formula (23)

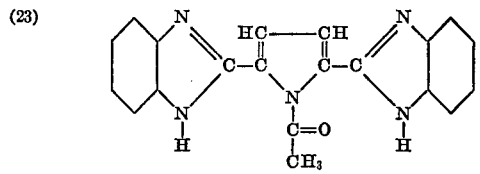

is a pale yellow powder which dissolves in an aqueous alcoholic solution of sodium hydroxide to give a violet blue fluorescence. It is suitable as an optical brightening agent for polyacrylonitrile fibers.

Example 13

45.2 parts of the condensation product of the Formula 5 are heated, while stirring and with the exclusion of air, with 186.2 parts of aniline for 4 hours at 110–160° C., during which time the water formed is continuously removed from the reaction mixture. The temperature is maintained at 160–165° C. until the formation of water ceases, and then the excess of aniline is distilled off with steam. From the still hot distillation residue the solid material is filtered, washed with water and dried. By recrystallization from sulfuric acid of 10% strength there is obtained the monosulfate of 2:5-di-[benzimidazyl-(2)]-1-phenyl-pyrrole of the Formula 20 in the form of a greyish brown powder.

Example 14

299 parts of 2:5-di-[benzimidazyl-(2)]-pyrrole are dissolved at 30–35° C. in 1000 parts by volume of ethanol by the dropwise addition of 100 parts by volume of an aqueous sodium hydroxide solution of 30 percent strength. In the course of 3 to 3½ hours there are then simultaneously added dropwise while stirring vigorously 200 parts by volume of aqueous sodium hydroxide solution of 30 percent strength and 315 parts of dimethyl sulfate, the temperature being raised gradually to 50° C. After that, stirring is continued for 6 to 7 hours at 60 to 70° C., the reaction mass then cooled to about 5° C. and filtered. On washing with ethanol and water there are obtained about 292–295 parts of the methylation product in the form of a yellow powder which can be further purified by recrystallization from ethylene glycol. The product is suitable for optically brightening acetyl cellulose fibers.

When instead of the 315 parts of dimethyl sulfate an equimolecular quantity of benzyl chloride is used a product with similar properties is obtained.

Example 15

35 parts of the methylation product of 2:5-di-[benzimidazyl-(2)]-pyrrole obtained as described in Example 14 are stirred for 15–18 hours at 115° C. in 50 parts by volume of ethylene glycol with 38 parts of dimethyl sulfate. The reaction product separates gradually from the initially clear solution. It is diluted with 50 parts by volume of methanol, cooled to 5–10° C., stirred for some time at that temperature, and filtered. On washing with methanol and drying, about 48 to 49 parts of a nearly colorless imidazolium compound are obtained which dissolves in hot water to give a clear solution. It is suitable for the optical brightening of proteine polyamide or acetyl cellulose fibers from a neutral to weakly alkaline bath.

Products with similar properties are obtained when instead of the 38 parts of dimethyl sulfate an equimolecular quantity of diethyl sulfate or paratoluene sulfonic acid ethyl ester is used. When the latter is used, the reaction temperature should be 135–145° C.

Example 16

Polyacrylonitrile fibers, for example, "Orlon," are treated at a liquor ratio of 1:40 with 0.03% of the 2:5-di-[benzimidazyl-(2)]-pyrrole obtained as described in Example 1 or 2 for one hour at 90–100° C. in a bath which contains per liter, 5 grams of formic acid of 85% strength. After being rinsed and dried, the fibers so treated have a higher content of white than the untreated material.

By using instead of 2:5-di-[benzimidazyl-(2)]-pyrrole, 2:5-di-[6-methyl-benzimidazyl-(2)]-pyrrole similar white effects are obtained.

Example 17

The sodium salt of 2-heptadecyl-N-benzyl-benzimidazyl-disulfonic acid is mixed with 0.1–0.5% of the 2:5-di-[benzimidazyl-(2)]-pyrrole obtainable as described in Example 1 or 2. Undyed textile goods of cellulose fibers, which have been washed in the usual manner with the aforesaid mixture have a brighter appearance than textile goods which have been washed with the aforesaid sodium salt alone.

Example 18

To a paper pulp containing 100 parts of bleached cellulose there are added in a hollander first 2 parts of resin size and then an aqueous alcoholic solution of 0.2 part of the 2:5-di-[benzimidazyl-(2)]-pyrrole obtained as described in Example 1 or 2. After 15 minutes there are added 3 parts of aluminum sulfate. The paper so treated is then passed through a mixing vat on the paper machine. The paper treated in this manner has a higher content of white than the untreated paper.

*Example 19*

At a liquor ratio of 1:30, protein fibers, e.g. wool, acetyl cellulose fibers, or polyamide fibers, e.g. nylon, are treated for 30 minutes at 50° C. in a bath containing, per liter, 2 ml. of concentrated aqueous ammonium hydroxide solution, with 0.05 percent of the imidazolium compound obtained as described in Example 15 from methylated 2:5-di-[benzimidazyl-(2)]-pyrrole and dimethyl sulfate. After being rinsed and dried the fibers so treated have a greater white content than untreated material.

When instead of the 2 ml. of aqueous ammonium hydroxide solution 3 grams of the reaction product of about 9 mols of ethylene oxide and 1 mol of para-nonylphenol is used, a washing effect is obtained in addition to the optical brightening.

What is claimed is:
1. A member selected from the group consisting of (1) compounds of the formula

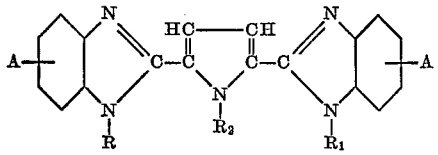

(2) acid addition salts of said compounds and (3) alkyl, aralkyl, sulfoalkyl, sulfoaralkyl and hydroxyalkyl quaternary ammonium salts of said compounds; A representing a member selected from the group consisting of a hydrogen atom, a chlorine atom, a methyl group and a methoxy group; R and $R_1$ each representing a member selected from the group consisting of a hydrogen atom, a methyl group and an ethyl group; and $R_2$ representing a member selected from the group consisting of a hydrogen atom, an acyl radical of a carboxylic acid and a radical obtained by removing the $H_2N$— group from a primary amine.

2. Compounds of the formula

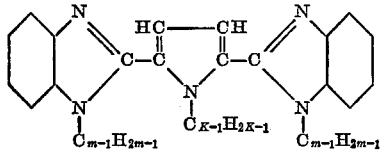

in which K and $m$ each represent a whole number of at the most 3.

3. Compounds of the formula

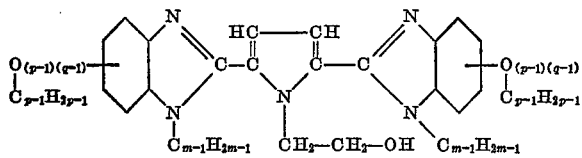

in which $m$ represents a whole number of at the most 3 and $p$ and $q$ each represent a whole number of at the most 2.

4. Compounds of the formula

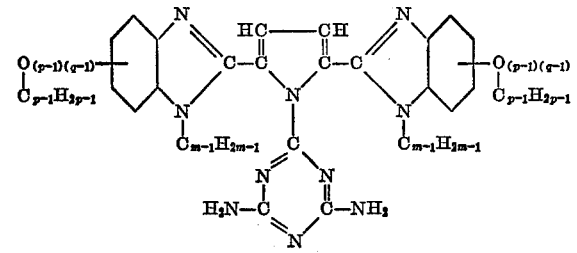

in which $m$ represents a whole number of at the most 3 and $p$ and $q$ each represent a whole number of at the most 2.

5. Compounds of the formula

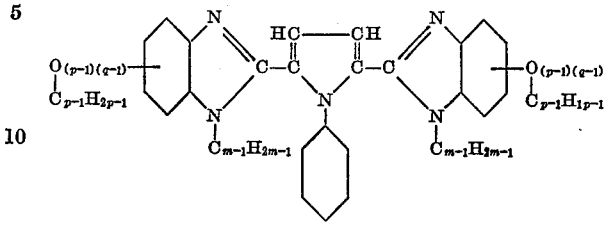

in which $m$ represents a whole number of at the most 3 and $p$ and $q$ each represent a whole number of at the most 2.

6. Compounds of the formula

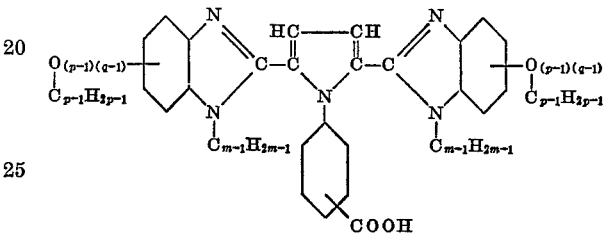

in which $m$ represents a whole number of at the most 3 and $p$ and $q$ each represent a whole number of at the most 2.

7. Compounds of the formula

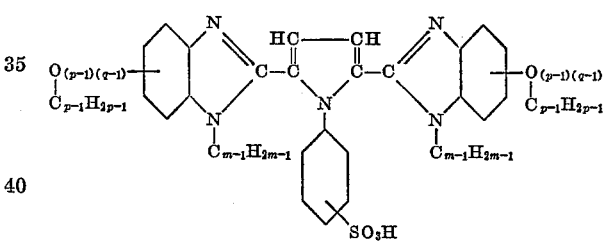

in which $m$ represents a whole number of at the most 3, and $p$ and $q$ each represent a whole number of at the most 2.

8. Compounds of the formula

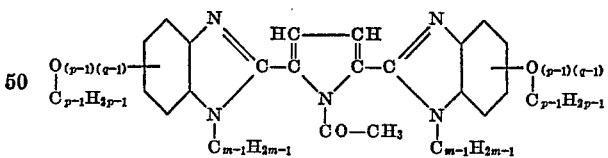

in which $m$ represents a whole number of at the most 3 and $p$ and $q$ each represent a whole number of at the most 2.

9. Compounds of the formula

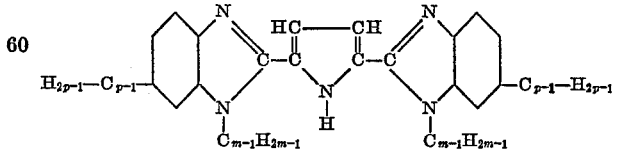

in which $m$ and $p$ each represent a whole number of at the most 2.

10. The pyrrole derivative which corresponds to the formula

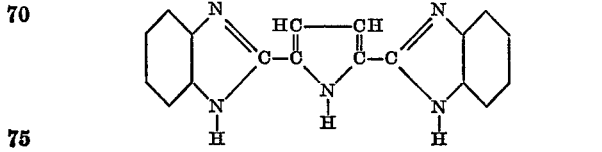

11. The pyrrole derivative which corresponds to the formula

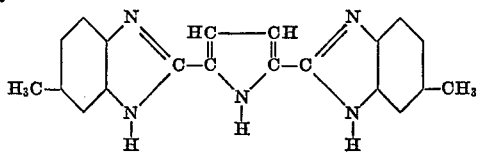

12. The pyrrole derivative which corresponds to the formula

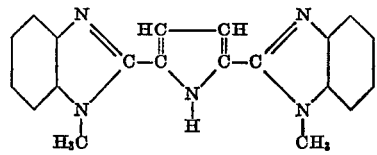

13. The pyrrole derivative obtained by methylating 2:5-di-[benzimidazyl-(2)]-pyrrol with dimethyl sulfate at 50–70° C. in an ethanol solution containing an excess of sodium hydroxide.

14. The pyrrole derivative obtained by further methylating the compound obtained according to claim 13 with dimethyl sulfate in ethylene glycol at about 115° C.

No references cited.

---

UNITED STATES PATENT OFFICE
Certificate of Correction

Patent No. 2,901,480              August 25, 1959

Adolf Emil Siegrist et al.

It is hereby certified that error appears in the printed specification of the above numbered patent requiring correction and that the said Letters Patent should read as corrected below.

Column 4, line 42, for "with" read —which—; column 5, line 69, for "lamellate" read —lamellae—; column 8, line 40, extreme right-hand portion of the formula, for "—OCH" read ——OCH₃—; column 10, lines 3 to 13, the formula should appear as shown below instead of as in the patent—

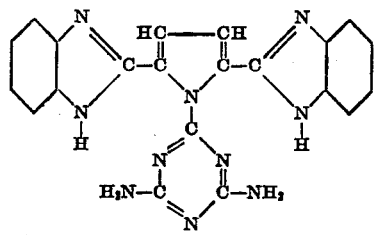

column 12, line 41, for "proteine" read —protein—.

Signed and sealed this 14th day of June 1960.

[SEAL]

Attest:
KARL H. AXLINE,
*Attesting Officer.*

ROBERT C. WATSON,
*Commissioner of Patents.*

UNITED STATES PATENT OFFICE
Certificate of Correction

Patent No. 2,901,480                                                          August 25, 1959

Adolf Emil Siegrist et al.

It is hereby certified that error appears in the printed specification of the above numbered patent requiring correction and that the said Letters Patent should read as corrected below.

Column 4, line 42, for "with" read —which—; column 5, line 69, for "lamellate" read —lamellae—; column 8, line 40, extreme right-hand portion of the formula, for "—OCH" read ——OCH₃—; column 10, lines 3 to 13, the formula should appear as shown below instead of as in the patent—

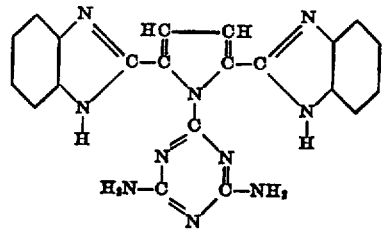

column 12, line 41, for "proteine" read —protein—.

Signed and sealed this 14th day of June 1960.

[SEAL]

Attest:
KARL H. AXLINE,
*Attesting Officer.*

ROBERT C. WATSON,
*Commissioner of Patents.*